United States Patent
Tikkanen

(10) Patent No.: US 11,863,027 B2
(45) Date of Patent: Jan. 2, 2024

(54) REDUCTION OF SHAFT VOLTAGE

(71) Applicant: ABB Schweiz AG, Baden (CH)

(72) Inventor: Kari Tikkanen, New Berlin, WI (US)

(73) Assignee: ABB Schweiz AG, Baden (CH)

( * ) Notice: Subject to any disclaimer, the term of this patent is extended or adjusted under 35 U.S.C. 154(b) by 16 days.

(21) Appl. No.: 17/450,077

(22) Filed: Oct. 6, 2021

(65) Prior Publication Data
US 2023/0106225 A1  Apr. 6, 2023

(51) Int. Cl.
*H02K 11/00* (2016.01)
*H02K 15/00* (2006.01)
*H02K 11/40* (2016.01)
*H02P 27/04* (2016.01)

(52) U.S. Cl.
CPC ..... *H02K 11/0094* (2013.01); *H02K 15/0068* (2013.01); *H02K 11/40* (2016.01); *H02P 27/04* (2013.01)

(58) Field of Classification Search
CPC .... H02K 11/40; H02K 11/0141; H02K 5/161; H02K 5/16; H02K 11/21
See application file for complete search history.

(56) References Cited

U.S. PATENT DOCUMENTS

| | | | | |
|---|---|---|---|---|
| 6,091,173 A | * | 7/2000 | Byrd | H02K 11/012 310/90 |
| 6,670,733 B2 | * | 12/2003 | Melfi | H02K 11/40 310/90 |
| 9,917,491 B2 | * | 3/2018 | Northwall | H02K 5/136 |

FOREIGN PATENT DOCUMENTS

CN  108886296 A  * 11/2018  ........... H01R 39/025

OTHER PUBLICATIONS

CN-108886296-A machine translation Dec. 17, 2022.*

* cited by examiner

*Primary Examiner* — Leda T Pham
(74) *Attorney, Agent, or Firm* — Whitmyer IP Group LLC

(57) ABSTRACT

A rotating electrical machine and a method of manufacturing a rotating electrical machine. The machine including a machine frame, a rotor, a shaft attached to the rotor and bearings supporting the shaft and the rotor in the machine frame. The rotating electrical machine includes further an electrically conducting member having a hole, the electrically conducting member being attached to the frame such that the shaft extends through the hole.

10 Claims, 1 Drawing Sheet

REDUCTION OF SHAFT VOLTAGE

TECHNICAL FIELD

The invention relates to reduction of shaft voltage of rotating electrical machines.

BACKGROUND

Frequency converters or inverters are commonly used in connection with rotating electrical machines. In a frequency converter alternating voltage is inputted to the device and rectified. The rectified voltage is again transformed to an alternating voltage using an inverter bridge. A voltage source inverter produces voltage pulses from the rectified DC voltage with a high frequency such that the outputted average voltage corresponds to desired voltage.

The use of frequency converters may lead to common mode voltages and further to voltages seen in the shaft of the rotating electrical machine. Common mode voltage is formed in the stator windings of the rotating electrical machine, and it is coupled capacitively to the rotor to the machine. The voltage fluctuations in the rotor are also seen in the rotor shaft as shaft voltages, i.e. as a fluctuating potential difference between the shaft and the ground.

The frame of the rotating electrical machines, such as a motor, is typically grounded. As the voltage of the shaft fluctuates, the potential difference is also seen over the bearings of the machine. The shaft voltage may increase such that current flows through the bearings to the ground. This bearing current may gradually cause wearing of the bearings.

SUMMARY

An object of the present invention is to provide a rotating electrical machine and a method of manufacturing a machine so as to alleviate the above disadvantage. The object of the invention is achieved by a method and a device which are characterized by what is stated in the independent claims. The preferred embodiments of the invention are disclosed in the dependent claims.

The invention is based on the idea of providing additional capacitance between the shaft of the machine and the frame of the machine. The additional capacitance is effectively connected in parallel with the bearing capacitance and in series with the capacitance from the stator windings to the rotor. The increase of the capacitance lowers the shaft voltage and thus decreases the possibility of bearing currents.

The additional capacitance is formed in an embodiment by attaching an electrically conducting plate with a hole for the shaft to the frame of the motor. With the electrically conducting plate, capacitance is formed between the plate and the shaft.

An advantage of the device of the invention is that bearing currents may be eliminated with a simple structure. The elimination or reduction of the bearing currents may also lead to increase in the service life of a rotating electrical machine.

BRIEF DESCRIPTION OF THE DRAWINGS

In the following the invention will be described in greater detail by means of preferred embodiments with reference to the attached drawings, in which.

DETAILED DESCRIPTION

Figure 1:
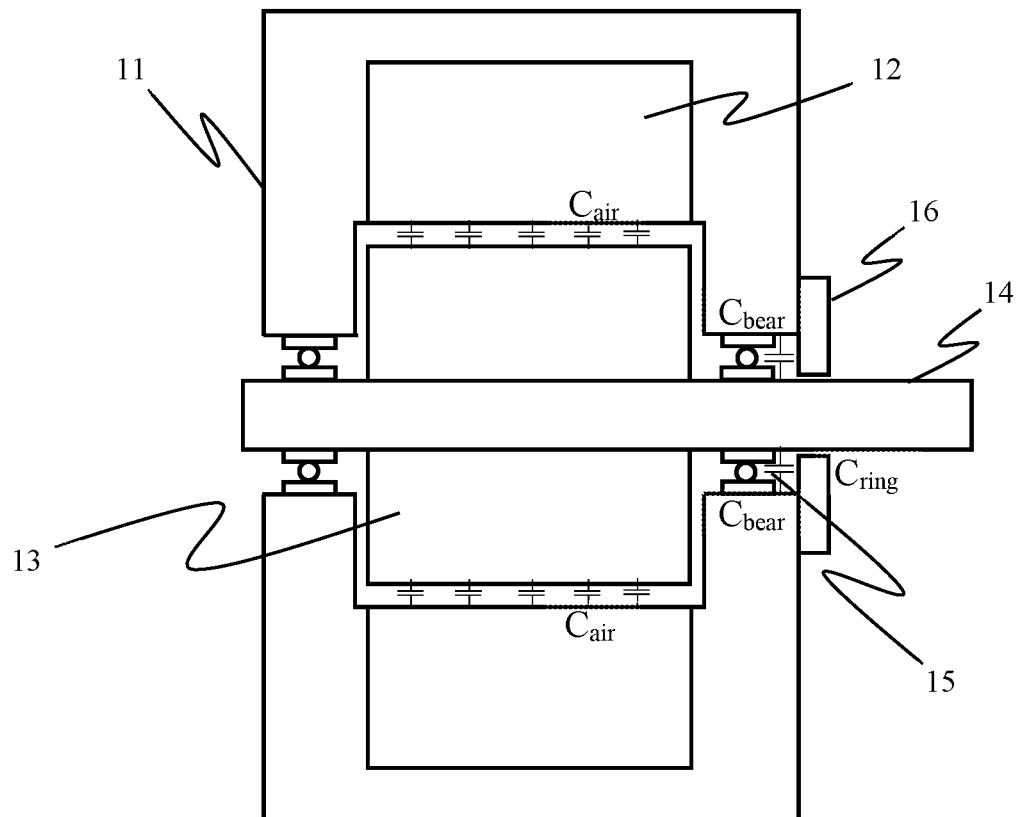
FIG. 1 shows a simplified structure of a rotating electrical machine of an embodiment of the invention.

FIG. 1 shows a simplified structure of a cross-section of a rotating electrical machine, such as a motor. The machine of FIG. 1 comprises a machine frame 11 to which a stator 12 of the machine is attached. A rotor 13 is arranged inside the stator 12 and a shaft 14 is attached to the rotor. The rotor is supported in the frame with bearings 15 which are arranged between the shaft and the machine frame.

The frame of an electrical machine is typically grounded. When an electrical machine is fed with a frequency converter or with a similar device, common mode voltage is formed between the stator of the machine and grounded frame. In the simplified structure of FIG. 1 it is shown that the stator of the machine is capacitively coupled to the rotor of the machine. The capacitance between the two is shown to be as $C_{air}$. Further, another capacitance $C_{bear}$ is shown between the machine frame and the shaft. As the common mode voltage is formed between the stator and the ground, the formed capacitances from the stator to the rotor $C_{air}$ and from the rotor shaft to the frame $C_{bear}$ are effectively coupled in series.

It is known that in a series connection of capacitances that the charge is evenly distributed among the capacitors. This further leads to the fact that voltages in series connection of capacitors are inversely proportional to the capacitance. Thus, if the bearing capacitance $C_{bear}$ is small compared to the stator rotor capacitance $C_{air}$, then most of the common mode voltage is effective across the bearing.

In the present invention a rotating electrical machine comprises a machine frame, a rotor, a shaft attached to the rotor, and bearings supporting the shaft and the rotor in the machine frame. Further, the rotating electrical machine comprises an electrically conducting member 16 having a hole, the member being attached to the machine frame such that the shaft extends through the hole.

The cross-sectional view of FIG. 1 shows an embodiment in which the electrically conducting member 16 is attached to the machine frame and the shaft of the electrical machine extends through the hole.

Figure 2:
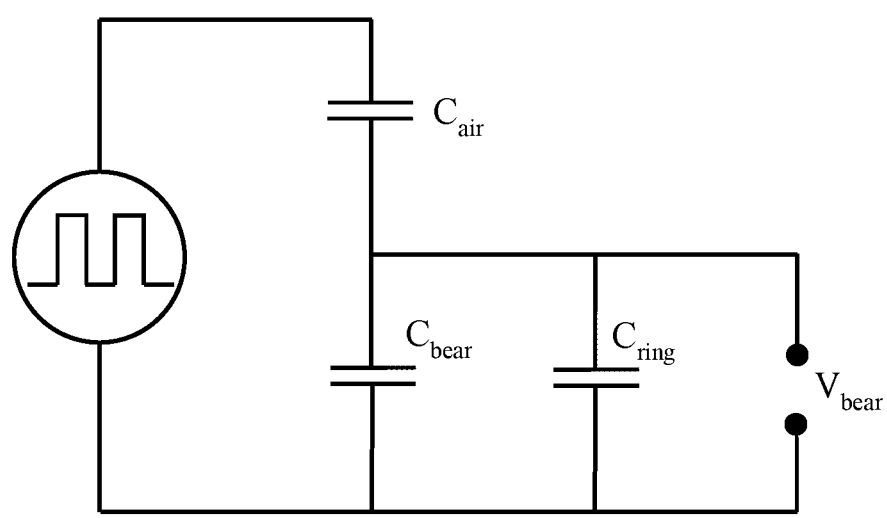
FIG. 2 shows simplified capacitive couplings of the rotating electrical machine of an embodiment.

The electrically conducting member is preferably a metal plate, which is made of one piece of metal. The metal plate is attached to the machine frame such that they are galvanically coupled. When a metal plate is attached as described, a capacitive coupling is formed between the shaft and the machine frame. In FIG. 1 this is depicted as capacitance $C_{ring}$. The capacitance $C_{ring}$ is effectively in parallel with the bearing capacitance $C_{bear}$. This is further illustrated in FIG. 2 in which a simplified circuit diagram is shown. When capacitances $C_{ring}$ and $C_{bear}$ are connected in parallel, the effective capacitance value is increased. As the stator to rotor capacitance $C_{air}$ stays the same, the increased capacitance leads to decreased voltage $V_{bear}$ over the bearings due to the common mode voltage.

As mentioned above, the electrically conducting member is preferably a one-piece metal plate which is machined so that a hole is formed in the plate. The dimension of the hole in the electrically conducting member correspond preferably to the outer diameter of the shaft. When attached to the frame, the electrically conducting member is preferably in mechanical contact with the shaft. That is, the hole is comparatively tight with respect to the shaft. Once attached to the frame and when the electrical machine is operated, the shaft of the machine rotates in the hole and makes the hole in the electrically conducting member larger. The hole in the electrically conducting member enlarges to a certain diameter which is slightly larger than the diameter of the shaft. Thus, when installed, the electrically conducting member does not necessarily form a capacitive coupling with the shaft. When installed the coupling between the shaft and the electrically conducting member is galvanic. Once the shaft has rotated in the hole for a certain time, the diameter of the hole gets larger, and the galvanic connection is lost. It is known that the value of capacitance is inversely proportional to the difference between the capacitor plates, which correspond here to the shaft and the electrically conducting member. As the gap between the two is machined by the shaft to a minimal value, the effective capacitance has a maximal value.

According to an embodiment, the electrically conducting member, such as a metal plate, is formed of multiple pieces. The formation of metal plate from multiple of pieces, such as two, may be preferred as a tight fitting with the shaft can be obtained without the need of inserting the shaft through the hole. When formed of multiple of pieces, the electrically conducting member can be constructed to form a hole. When installing, the pieces of the electrically conducting member are attached to each other and to the machine frame such that the shaft is situated in the hole formed of the separate pieces.

The material of the electrically conducting member is preferably copper. Copper as a material is soft such that the shaft of the machine can wear the inner surface of the hole easily so that capacitive properties are obtained. The electrically conducting member may also be made of electrically conducting alloys. For example, the member may be epoxy having electrically conducting properties. The electrically conducting member of the disclosure comprises electrically conducting properties and is preferably of a material that is softer than the shaft.

The electrically conducting member which may be a metallic member, such as a metal plate, is preferably attached to the machine frame by welding, soldering or with screws. It is to be understood, that purpose of attaching the plate to the machine frame is to obtain a galvanic connection between the machine frame and the member.

In the method of the invention, a rotating electrical machine with a machine frame and a shaft is provided, and an electrically conducting member with a hole is provided, the diameter of the hole corresponding to the diameter of the shaft.

Further in the method, the electrically conducting member is attached to the machine frame such that the shaft extends through the hole.

In the method, the electrically conducting member is preferably a metal plate. Further, the electrically conducting member is preferably in mechanical contact with the shaft when installed. The mechanical contact also means that the shaft and the electrically conducting member are in galvanic contact. According to an embodiment, when the rotating electrical machine is operated to rotate the shaft, the hole is enlarged such that a galvanic connection is lost, and capacitive coupling is established.

It should be understood, that in addition to the above-described capacitive couplings, other capacitive couplings are present in a rotating electrical machine. However, the above simplification and the capacitive couplings are presented for understanding the effect of the invention.

It will be obvious to a person skilled in the art that, as the technology advances, the inventive concept can be implemented in various ways. The invention and its embodiments are not limited to the examples described above but may vary within the scope of the claims.

The invention claimed is:

1. A rotating electrical machine comprising a machine frame, a rotor, a shaft attached to the rotor, and bearings supporting the shaft and the rotor in the machine frame,
   wherein the rotating electrical machine includes further an electrically conducting member having a hole, the electrically conducting member being attached to the machine frame such that the shaft extends through the hole, and wherein the electrically conducting member and the shaft form a capacitive coupling without a galvanic coupling.

2. The rotating electrical machine according to claim 1, wherein the electrically conducting member is a metal plate.

3. The rotating electrical machine according to claim 2, wherein the metal plate is a one-piece metal plate.

4. The rotating electrical machine according to claim 2, wherein the metal plate is formed of multiple of metal pieces.

5. A method of manufacturing a rotating electrical machine with shaft voltage limitation, the method comprising:
   providing a rotating electrical machine with a machine frame and a shaft;
   providing an electrically conducting member with a hole, a diameter of the hole corresponding to a diameter of the shaft;
   attaching the electrically conducting member to the machine frame such that the shaft extends through the hole; and
   enlarging the hole in the electrically conducting member by operating the rotating electrical machine to rotate the shaft such that a galvanic coupling between the shaft and the electrically conducting member is lost and a capacitive coupling is obtained between the shaft and the electrically conducting member.

6. The method according to claim 5, wherein the electrically conducting member is a metal plate.

7. The method according to claim 6, wherein the metal plate is in mechanical contact with the shaft when installed.

8. A rotating electrical machine comprising a machine frame, a rotor, a shaft attached to the rotor and bearings supporting the shaft and the rotor in the machine frame,
   wherein the rotating electrical machine includes further an electrically conducting member having a hole, the electrically conducting member being attached to the machine frame such that the shaft extends through the hole,
   wherein the electrically conducting member is in galvanic connection with the shaft when attached to the machine frame, and
   wherein a diameter of the hole in the electrically conducting member is adapted to increase, such that a galvanic coupling between the shaft and the electrically conducting member is lost, to form a capacitive coupling between the electrically conducting member and the shaft.

9. The rotating electrical machine according to claim 8, wherein the diameter of the hole in the electrically conducting member is adapted to increase when the electrical machine is operated.

10. The rotating electrical machine according to claim 8, wherein the diameter of the hole corresponds to a diameter of the shaft when attached to the machine frame.

\* \* \* \* \*